(12) United States Patent
Zatko (10) Patent No.: US 7,773,540 B1
(45) Date of Patent: Aug. 10, 2010

(54) METHODS, SYSTEM AND APPARATUS PREVENTING NETWORK AND DEVICE IDENTIFICATION

(75) Inventor: Peiter Charles Zatko, Somerville, MA (US)

(73) Assignee: BBN Technologies Corp., Cambridge, MA (US)

( * ) Notice: Subject to any disclaimer, the term of this patent is extended or adjusted under 35 U.S.C. 154(b) by 1023 days.

(21) Appl. No.: 11/445,686

(22) Filed: Jun. 1, 2006

(51) Int. Cl.
*H04L 12/24* (2006.01)
(52) U.S. Cl. ............ 370/254; 370/395.2; 370/401
(58) Field of Classification Search .......... None
See application file for complete search history.

(56) References Cited

U.S. PATENT DOCUMENTS

| | | | |
|---|---|---|---|
| 6,363,489 B1* | 3/2002 | Comay et al. ........... 726/22 |
| 7,002,943 B2* | 2/2006 | Bhagwat et al. ......... 370/338 |
| 7,302,480 B2* | 11/2007 | Lahtinen .............. 709/224 |
| 7,316,031 B2* | 1/2008 | Griffith et al. .......... 726/22 |
| 7,551,620 B1* | 6/2009 | Samuels et al. ......... 370/394 |
| 2002/0023227 A1* | 2/2002 | Sheymov et al. ........ 713/201 |
| 2004/0117486 A1* | 6/2004 | Bourne et al. .......... 709/228 |
| 2005/0068169 A1* | 3/2005 | Copley et al. ......... 340/539.13 |
| 2006/0075491 A1* | 4/2006 | Lyon ................ 726/22 |

\* cited by examiner

*Primary Examiner*—Chirag G Shah
*Assistant Examiner*—Daniel Mitchell
(74) *Attorney, Agent, or Firm*—Chapin IP Law, LLC (57) ABSTRACT

A system processes data communications traffic by detecting data communications traffic arriving at a network device for an intended recipient device and determining if the data communications traffic is at least one of initial data communications traffic for a new data communications session, or continuing data communications traffic for an existing data communications session. If the data communications traffic is initial data communications traffic, the system proxy responds to a source of the initial data communications traffic with an expected response that provides an appearance of the existence of an intended recipient device of the initial data communications traffic, regardless if the intended recipient device of the initial data communications traffic actually exists. The system prevents effective use of network probes or scans to identify network devices.

21 Claims, 6 Drawing Sheets

METHODS, SYSTEM AND APPARATUS PREVENTING NETWORK AND DEVICE IDENTIFICATION

BACKGROUND

Modern computer and communications networks interconnect a variety of different types of computer systems that operate many types of operating systems and software applications. The computer systems and data communications devices in such network are able to communicate with one another using different types of data communications protocols. A data communications protocol is generally a set of agreed-upon message formats and rules for processing such messages that software applications, firmware or hardware operating on data communications devices and computer systems within a network can implement in order to exchange data and information with each other.

Conventional implementations of data communications within network devices or computer systems typically provide a communications protocol stack in which different protocols are implemented by hardware or software processing for different layers of the stack. Each protocol in each layer of the stack serves a particular purpose. Communications messages or packets are thus collections of built-up protocol headers and data arranged according to the protocols implemented for the different layers of the protocol stack. A packet traveling in the network may include header information for several different protocols from different layers in the stack.

As an example, for a typical communications packet that is transmitted over an Internet Protocol (IP)-based network such as the Internet, an upper-layer application level protocol such as the hypertext transport protocol (HTTP) provides an HTTP header and payload information that is nested within a Transmission Control Protocol (TCP) packet header that is further nested within an Internet Protocol (IP) packet header. As such a packet travels across the Internet, each data communications device and/or computer system that receives the packet can apply appropriate protocol processing to the packet header corresponding to different layers of the protocol stack, as may be required, to properly process and forward or route that packet. As an example, the IP header allows data communications devices such as switches and routers in the network to route the packet towards its final destination. The TCP header allows a destination computer system to order received packets in the order they were transmitted and to ensure that the packets arrive error-free. Additionally, the TCP header includes a field known as the port number that allows a specification of an application layer protocol to be used during the communications between a source and destination computer. As an example, if the TCP/IP packet arrives with its port number set to 80, this typically indicates the packet is associated with the HTTP protocol. TCP port numbers can range from 0 up to 65535 and computer systems on a network can enable services that "listen" for certain packets having certain predefined port number specified in their TCP (or UDP) packet headers. The HTTP information within the packet is an application layer protocol that allows a web-based application, such as a web browser or web server, executing on the destination computer system to process information in the packet associated with HTTP processing.

Some protocols may require a series of back and forth message exchanges generally referred to as a handshaking sequence to enable each computer system to properly establish protocol state or other information prior to the protocol becoming fully operational. As an example, when two applications communicate using TCP, a TCP handshake occurs in which a source or initiating computer system transmits an initial TCP synchronize (TCP SYN) packet to the remote computer system which then responds with its own synchronize bit set and its own initial sequence number along with an acknowledgment (TCP SYN|ACK) of the initial synchronize packet sent from the first system in the prior packet. Upon receipt of the TCP acknowledgment, the initiating or source computer system further acknowledges this with a TCP ACK packet (an acknowledgment of the second packet where the recipient system acknowledged the initial SYN packet and sent its own synchronize bit and initial sequence number to the originating system). This exchange is referred to as the TCP three-way handshake. As data is exchanged after establishment of the TCP handshake, session state is maintained by both computer systems in the session to enable proper packet processing at each end.

Standards organizations have developed a number of specific data communications protocols that enable computer systems to discover information about one another within computer networks. As an example, the Internet Control Messaging Protocol provides a set of message requests and responses collectively known as the ping protocol. The ping protocol allows an application executing on a source computer system on a computer network to generate an Internet Control Message Protocol (ICMP) echo request that will be responded to with an ICMP echo reply packet when received by a (usually) remote system on a network. The purpose of the ping request is to try to identify the existence and operation of the remote computer system at the specified address. Data communication devices within the network that receive an IP packet containing an ICMP header specifying an ICMP type of ECHO (also referred to as a 'ping') typically transfer the ping request through the network towards the specified address. If the ping request message reaches the intended destination computer system having the address specified in the request, the destination computer system responds with an ICMP echo reply response message indicating the operational presence of the destination computer system on the network. A typical ICMP ECHO REPLY will include the original information that was sent in the initial ICMP ECHO request. This information is usually a timer to enable the initiating system to determine the network latency when receiving an associated response packet. Network administrators often use the ping protocol to test a communications link for accessibility to a remote computer system. Other protocols enable further information gathering from remote systems but the case of ICMP ECHO packets (ping) will be used as a general example for these varying stateless protocols.

SUMMARY

Conventional mechanisms for processing data communications protocols within computer networks suffer from a variety of deficiencies. In particular, conventional data communications protocols suffer a variety of drawbacks related to security when used in modern computer networks such as the Internet that support communications between millions of computer systems and users of those systems. In an attempt to exploit such security vulnerabilities, network attackers are constantly developing malicious applications to try and circumvent security mechanisms within computer networks and protocols that support communications.

As part of early stage planning for many types of attacks on a computer network (e.g. a corporate, government or other organizational network), a network attacker may attempt to determine the network architecture and the identity of computer systems within a network to be attacked. One way to do this is for the attacker to run scans or probes from a source network across the Internet against the target network. Using conventional technologies such as ICMP ping and even repeated TCP connection attempts at different addresses for different protocol services, an attacker can obtain detailed mappings and intelligence regarding existing networks, hosts and their operating systems, and network reachable services that are offered.

Embodiments disclosed herein provide a network protection system that significantly overcomes these drawbacks and security issues. The network protection system disclosed herein substantially eliminates the usefulness of scans and probes thus causing the antagonist to spend a disproportionate amount of time and manual effort (i.e., cost) in obtaining minimally useful information regarding the targeted network and its computer systems. As will be explained, the network protection system remains entirely transparent to authorized users of legitimate services within a network. Further, any adversary who attempts to run a scan or probe against a network equipped with the network protection system becomes even more vulnerable to both intelligence gathering and aggressive defensive measures against that adversary.

More specifically, the network protection system in one configuration provides a method for processing data communications traffic. The system detects data communications traffic arriving at a network device for an intended recipient device. In one configuration, the network protection system sits in-line with the communications link in front of the firewall of an organization that is protected by the network protection system. The system determines if the data communications traffic is either initial data communications traffic for a new data communications session or continuing data communications traffic for an existing data communications session. If the data communications traffic is initial data communications traffic, the system proxy responds to a source of the initial data communications traffic with an expected response that provides an "appearance" of the existence of an intended recipient device of the initial data communications traffic, regardless if the intended recipient device of the initial data communications traffic actually exists within the internal or protected network, and regardless of the protocol(s) specified in the initial traffic.

In this manner, the network protection system presents attackers running automated scans and probes that use various protocols with useless responses that essentially overwhelm a source trying repeated attempts to identify active computers and services within an internal network. For example, the network protection system will present an attacker application running a port scan with responses that indicate that every service (e.g. each TCP and UDP port) is open and every IP address is populated. The system negates operating system fingerprinting and can sanitize packet headers during their flow through the network protection system. The network protection system also enables legitimate users to continue using the services for which they are authorized into and out-of the protected network in a transparent fashion.

It is to be understood that the system operates to initially falsify responses for many different types of protocols and that the system is not limited to ICMP echo/ICMP echo-responses (ping collectively). Ping is discussed below by way of example only since it is a well known network tool to determine if a system or recipient device is 'alive' or not. ICMP is thus one example of one class of "stateless" network protocols (UDP is another example) and the system can operate to respond to dozens and dozens of "other" protocols (stateless or state-full). Within ICMP alone (and these would all follow similar processing to the processing discussed herein) other example protocols for which the system can respond include: sourcequench, redirect, routeradvertisement, routersolicitation, TTL-time exceeded, timestamps requests, netmask requests, information requests, and so forth. Many of these example have sub-groups (e.g. redirect-{host, net, host-tos, net-tos} and the like). Within UDP, some example protocols for which the system can respond as explained herein include DNS, NFS, CIFS, netbios-ns, netbios-dgm, netbios-ssn, bootp, tftp, and so forth. It is to be thus understood that ICMP ECHO (Ping) is used and explained herein as an example only and is not intended to be limiting of the system. Likewise, the above examples are not intended to be a complete list of all protocols for which the system can operate.

The system may be implemented as a dedicated data communications network device or computer having a processor, memory, and interface operable for performing the operations as disclosed herein or alternatively, the system can be implemented as a software process within a programmable device (e.g. a programmable router or switch or firewall) or within a general purpose computer system. Specific configurations include a computerized device such as a computer system, central processing unit, microprocessor, controller, electronic circuit, application-specific integrated circuit, or other hardware device configured to process some or all of the operations disclosed herein. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produce a process or processes that causes the computerized device to perform any and/or all of the method embodiments, steps and operations explained herein to allow execution of instructions in a computer program according to any suitable programming language or medium, as is known to those of skill in the art. In other words, a computer, processor, firewall, switch, router or other electronic device that is programmed to operate as explained herein is itself considered an embodiment of the invention.

The system can also be provided as software. A software embodiment comprises a computer program product that has a computer-readable medium including computer program logic encoded thereon that, when performed in a computerized device having a coupling of a memory and a processor, programs the processor to perform the gateway and/or replay system processing operations disclosed herein. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC). The software or firmware or other such configurations can be installed onto the computerized device to cause the computerized device to perform the techniques explained herein as embodiments. Thus, encoded items alone, or software code written to processes such a data format upon any computer readable medium or within a carrier wave in a propagated signal that contains instructions to carry out novel combinations of processing steps as explained herein, or any equivalents thereto, are considered embodiments. It is to be understood that the system can be embodied as a software program, hardware, firmware or any combination of these to processes data as explained herein.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
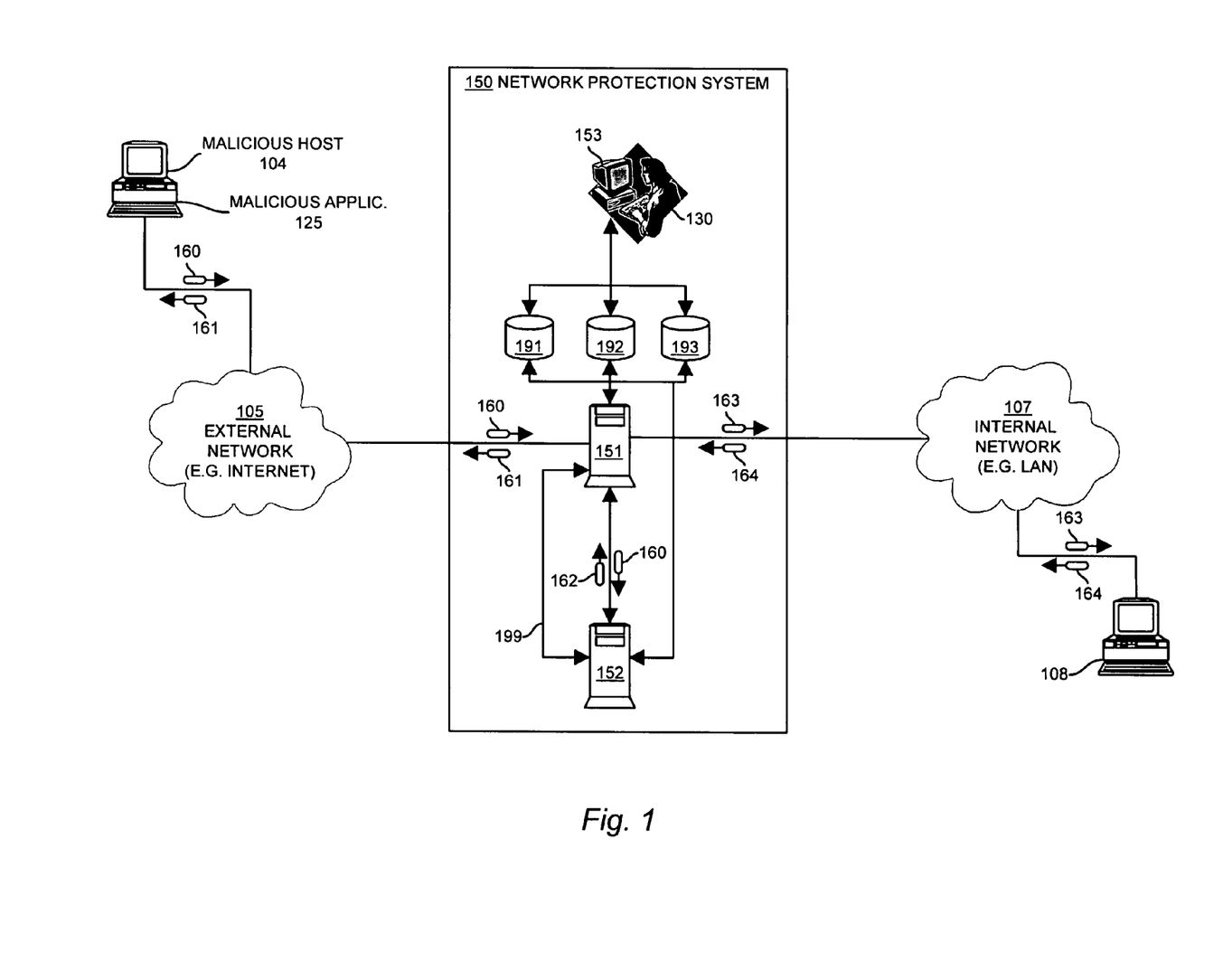
FIG. 1 illustrates an example of a network environment including a network protection system configured in accordance with embodiments of the invention.

FIG. 1 illustrates a network environment 100 suitable for use in explaining example embodiments disclosed herein. The environment includes a network protection system 150 that couples an external network 105 such as the Internet within an internal protected network 107 such as a corporate or other local area network. In the example configuration, the network protection system 150 sits in-line with the communications link or data path into and out of the internal protected network 107 and in front of the firewall 109, such that data communications traffic 160 originating from hosts 104 on the external network 105 and destined for host computers with 108 on the internal network 107 must initially pass through the network protection system 150. Likewise, outbound traffic 164 from devices 108 passes through the network protection system 150 as well. The network protection system 150 includes a gateway 151, a replay system 152 and an operations console 153. The system operates so that reconnaissance efforts of malicious source device 104 and probing or scanning applications 125 become "cost" prohibitive for the amount of intelligence data they return.

The gateway 151 operates as explained herein to detect all externally initiated probes and scans 160 and other traffic 160 directed toward the internal (trusted) network 107. In response to detecting such traffic 160, the gateway 151 can respond 161 by showing that every IP address to which a scan or probe is directed is populated with a host 108 and that every service (e.g. all TCP and/or UDP ports) on those hosts are active, regardless if such hosts 108 exist or not within the internal protected network 107. The gateway 151 provides this deceptive response 161 to scans and probes while continuing to permit legitimate connection attempts 165 and services between external hosts 104 and internal hosts 108 to proceed unimpeded. The gateway 151 does not require any special access to internal resources, configuration changes to routers, or modifications to existing rules of the firewall 109.

In addition to providing such responses, as connection attempts for hosts or devices (i.e. actual or suspected addresses) within the internal network arrive at the gateway 151, the gateway 151 can forward those connection attempts to the replay system 152. The replay system 152 receives, from the gateway 151, forwarded connection attempts from the external network 105 to hosts 108 on the internal network 107. The replay system 152 uses the forwarded connection attempts (which may be automated scans or probes) to engage in initial application dialog (e.g. after the initial TCP handshake) with external host systems 104 on the untrusted network 105 such as the Internet that are requesting access to a network service of a host 108 on the internal network 107. Once enough of the initial application dialog has been engaged in to determine that the connection attempt is not a service scan, probe or other malicious attempt to break into the network 107, the replay system 152 can update session state information 191/192 accessible to the gateway 151 to allow the gateway (or the replay system 152 directly) to roll the connection state forward with the original intended recipient internal host 108 providing the existing service through the firewall 109. In other words, the replay system 152 can cache session state 192 associated with the communications protocol session 160 and if it is substantially determined that the source host 104 is not engaged in malicious processing (e.g. the source complete the three way TCP handshake), the network protection system 150 can engage the intended recipient device such as a host 108 with the cached session state of the communications protocol session 160 to "roll-forward" the communications protocol session with the intended recipient device 108 to allow the intended recipient device to thereafter communicate with the source 104 of the data communications traffic through the gateway 151.

Once allowed, the gateway 151 provides adjustments to packets with connection state information, such as modifications to sequence and acknowledgement numbers and port translations for the duration of the session. Such translations may be required due to the replay system's 152 pre-engagement with the external host 104 prior to that external host 104 being able to actually communicate with the internal recipient device 108 to which it originally intended to communicate. Should the gateway 151 not be able to connect to the application on the host 108 being requested (e.g. because the connection attempt 160 is attempting to randomly or serially scan or probe suspected, but non-existent, addresses and services within the network 107, or because the host or service is administratively blocked by the firewall 109) the gateway 151 allows the communications session 160 to continue with the replay system 152 which behaves like an intelligent malware honeynet. A honeynet of this nature tries to communicate on the session as long as possible to gather as much data on the source of the connection as possible. This further requires the antagonist 125 to spend more time trying to communicate with a non-existent application (i.e., the honeynet) and often results in their reliance of, or falling back to, manual probing techniques. Further details of an example system that can be adapted as explained herein to serve as the replay system 152 are described in Cui, W., et al, *Protocol-Independent Adaptive Replay of Application Dialog*, 13th Annual Network and Distributed System Security (NDSS) Symposium Proceedings, 2-3 Feb. 2006, the contents and teachings of which are hereby incorporated by reference in their entirety.

Without the gateway 151, the network 107 would be unprotected from scans and probes. In such cases, attacking software 125 could run scans and probes 160 against the unprotected network 107 and alert a malicious user as to which host systems 108 were running and what services they offer. Further, some scanning might report the version and vendor of the service being offered, along with the operating system vendor and version for each host 108. This information might allow a malicious user to exploit known or discovered vulnerabilities of operating systems, protocols, and the like at any time after the successful scan.

In contrast, with the gateway 151 operating as explained herein installed, a scan 160 (e.g., repeated connection attempts for different services to suspected host addresses in the internal network 107) of a single class C network will report to the source attacker application 125 (a) that hosts exist on all 255 IP addresses within that network range, (b) that each host is listening on every one of their 65535 TCP and UDP service ports, (c) that the initial sequence numbers for each service are all truly random for TCP communications, and (d) that the operating system type and version is 'unknown' for every host. In addition to providing a completely inaccurate view of the network 107 (that was attempted to be scanned), the scan 160 takes orders of magnitude more time to complete for the attacker 125 since the gateway 151 responds affirmatively to all probes and connection attempts.

The architecture of the gateway 151 is adaptable. Software components for detection of specific types of connections or services can be turned on or off as required and the gateway 151 can be configured to respond granularly to attacks against specified IP addresses and ranges. The gateway 151 can also sanitize packet headers that are outbound for remote hosts 104, if required. The gateway system 151 can also be customized to respond in particular ways depending on how the malware honeynet replay system 152 interacts with various communications streams that are attempting to connect into the internal network 107. The gateway 151 can be configured to provide varying responses for different host detection scans such as NULL TCP scans, IP protocol sweeps, ICMP scans, etc. This enables an administrator of the gateway 151 to disable the system in varying degrees and levels in the event of unforeseen necessities while maintaining fine grain control over how the internal network 107 appears to external applications 125.

The operations console 153 provides an administrator 130 insight into data files 158 gathered by the gateway 151 and the replay system 152. The data files 158 can include information on sessions directed to a malware honeynet operated by the replay system 152, port scans that the gateway 151 has responded to, sessions 160 that have been successfully connected, and intelligence gathered on attacker scans and probes. The data 158 can be organized into databases or files that include session/service table mappings 191; applications replay state tables 192; and a log database 193. The gateway 151 records all available data regarding the attacker behavior in the log database 193, examples of which include: how the scans are distributed; scan timing data; and, any protocol-specific interactions with the malware honeynet replay system 152. This enables an administrator 130 to perform certain analysis on the attacker, such as operating system fingerprinting and packet timing for location estimates on malicious host computers 104. A wide range of intelligence on the source 104/125 can be queried in real time or for offline statistical analysis.

Figure 2:
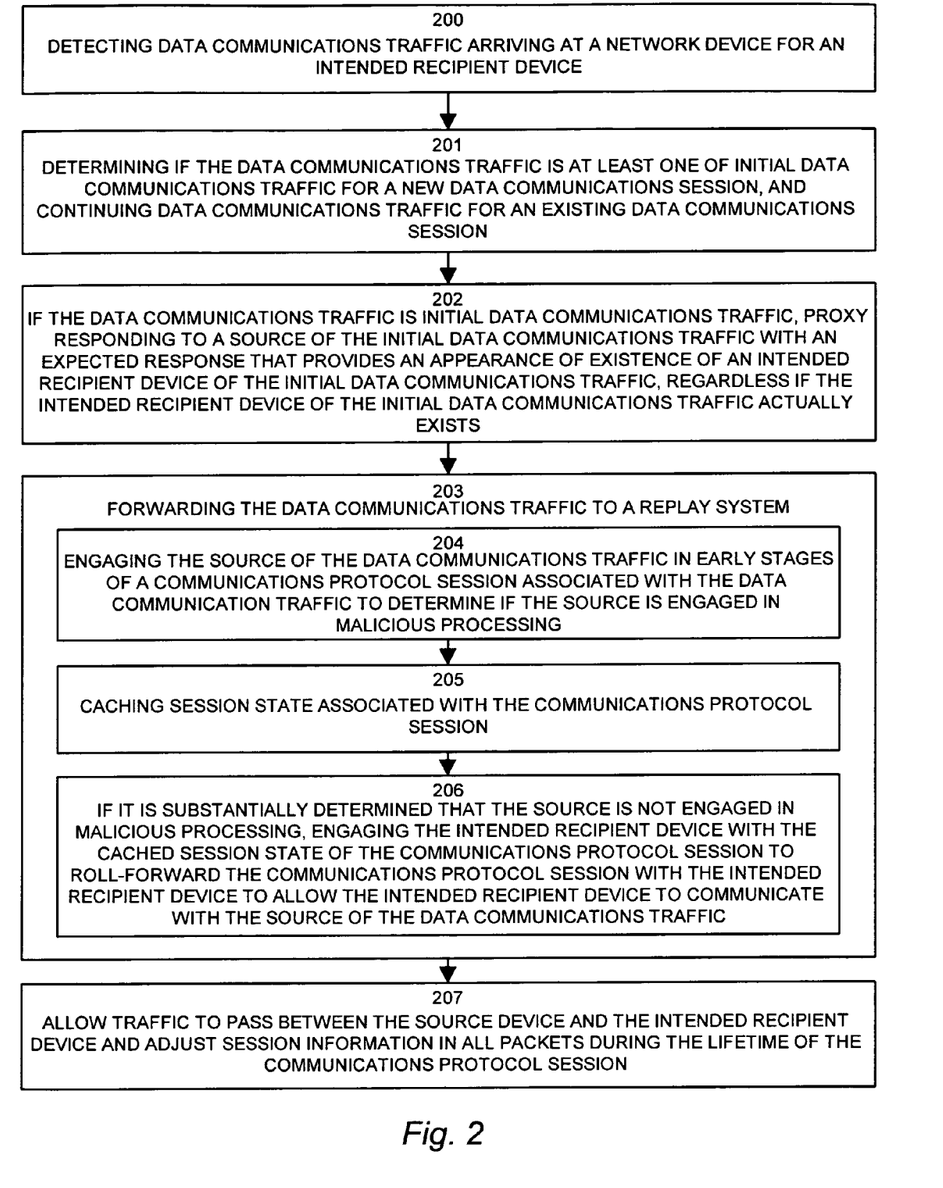
FIG. 2 is a flow chart of processing steps that a network protection system performs to provide processing of communications traffic in accordance with embodiments disclosed herein.

FIG. 2 is a flow chart of high level processing steps that the network protection system including the gateway 151 and replay system 152 provides in accordance with example embodiments to process data communications traffic 160.

In step 200, the gateway 151 detects data communications traffic 160 arriving for an intended recipient device within the internal network 107. The data communications traffic 160 may be a new connection attempt for an intended recipient device having an address in the range of the internal network 107, and the device (e.g. a host) may or may not actually exist on the network 107.

In step 201, the gateway 151 determines if the data communications traffic 160 is either initial data communications traffic for a new data communications session or continuing data communications traffic for an existing data communications session. Session state tables 191 and 192 can be checked as will be explained to determine if the source address, source port, and destination address and destination port (or other protocol information) or other packet information matches a previously established network connection that has already been authorized by the network protection system 150.

In step 202, if the data communications traffic 160 is initial data communications traffic, the gateway 151 proxy responds to a source (e.g. host 104 operating application 125) of the initial data communications traffic with an expected response 161 that provides an "appearance" of existence of the intended recipient device specified or requested by the initial data communications traffic 160, regardless if the intended recipient device of the initial data communications traffic actually exists. In this manner, remote hosts 104 that operate malicious software 125 that attempt to scan or probe the network 107 will be provided with false information that indicates that all hosts probed (i.e. all address to which a connection attempt is made) are active on the network 107 and are each providing every requested service protocol.

In step 203, if the data communications traffic 160 is initial data communications traffic (e.g. initial or early exchanges in a connection setup request), the gateway 151 forwards the data communications traffic 160 to a replay system 151 that operates as part of the network protection system in one configuration. Steps 204 through 206 show details of processing of the replay system 151.

In step 204, the replay system 150 engages the source (e.g. application 125 on host 104) of the data communications traffic 160 in early stages of a communications protocol session associated with the data communication traffic 160 for as long as necessary to determine if the source 104/125 is engaged in malicious processing.

In step 205 (and during step 204), the replay system 150 caches session state associated with the communications protocol session 161 while it is engaging the source in the early stages of the communications session. In this manner, if the replay system 152 determines (or presumes) that the source 104/125 is not merely probing for operating addresses and services, but is actually attempting a legitimate connection to an actual host 108 within the internal network, the cached session information 192 associated with the early stages of the communications session can be "replayed" from the network protection system 150 (either from the gateway 151 or replay system 152) to the actual intended recipient host 108 on the internal network 107 to bring that host 108 up to the current state of the communication session, as explained below in step 206.

In step 206, if it is substantially determined that the source 104/125 is not engaged in malicious processing, the replay system 150 (or the gateway 151, using the cached communications session state 192 maintained by the replay system 152) engages the intended recipient device (e.g. a host 108) with the cached session state of the communications protocol session to "roll-forward" or bring up to the current state the communications protocol session with the intended recipient device 108 to allow the intended recipient device 108 to thereafter communicate with the source 104/125 of the data communications traffic 160.

In this manner, the network protection system intercepts inbound connection attempts and responds affirmatively to all of them, regardless of whether or not they are directed to actual in-use addresses and services within the internal network 107. In addition to the initial affirmative response, the gateway 151 working in conjunction with the replay system 152 can continue to engage the source of the initial communications traffic (e.g. all traffic from the source 104 for a TCP three way handshake) and can keep state for the connection that is initially setup between the source 104/125 and the network protection system 150. Once the network protection system has determined that the source 104 is not simply probing the network for open addresses and services (e.g. once the source has completed the three way handshake, and possible has transmitted an application level protocol packet for whatever service that source 104/125 is trying to invoke), the network protection system 150 can "replay" or repeat the initial inbound communication traffic (stored in the cached state database 192) with the intended recipient device, such as a host 108 (or a data communications device in the network 107), as if that traffic were originating from the source 104/125. Accordingly, the intended recipient device 108 does not need to have knowledge of the operation of the network protection system 151, since the original inbound data communications traffic is repeated or "replayed" to that intended recipient device 108.

Note that early stage responses 164 (e.g. a TCP SYN ACK from the host 108), that are part of the initial protocol sent from the intended recipient device 108 that are transmitted from the internal network 107 for receipt by the source 104, are held (e.g. cached and/or dropped) by the network protection system 150 (e.g. by the gateway 151 or the replay system 152) since those early stage responses 164 would have been duplicated during the early engagement of the source 104/125 by the network protection system 150 (i.e. during the early stages of the communications session protocol during which the system 150 was determining if the source was making a legitimate connection attempt).

In step 207, once the state of the intended recipient device 108 has been synchronized with the state of the source 104/125, the gateway 151 can allow traffic to pass between the source device 104 and the intended recipient device 108 (and in the reverse direction) and can adjust session information such as TCP sequence and acknowledgement numbers as well as port re-mappings in all packets transmitted between the source 104 and intended recipient device 108 during the lifetime of the communications protocol session to account for the replay system 152 engaging in the early stages of the communications protocol session with the source 104 of the data communications traffic.

FIGS. 3 through 6 are flow charts showing more detailed processing of the system disclosed herein.

Figure 3:
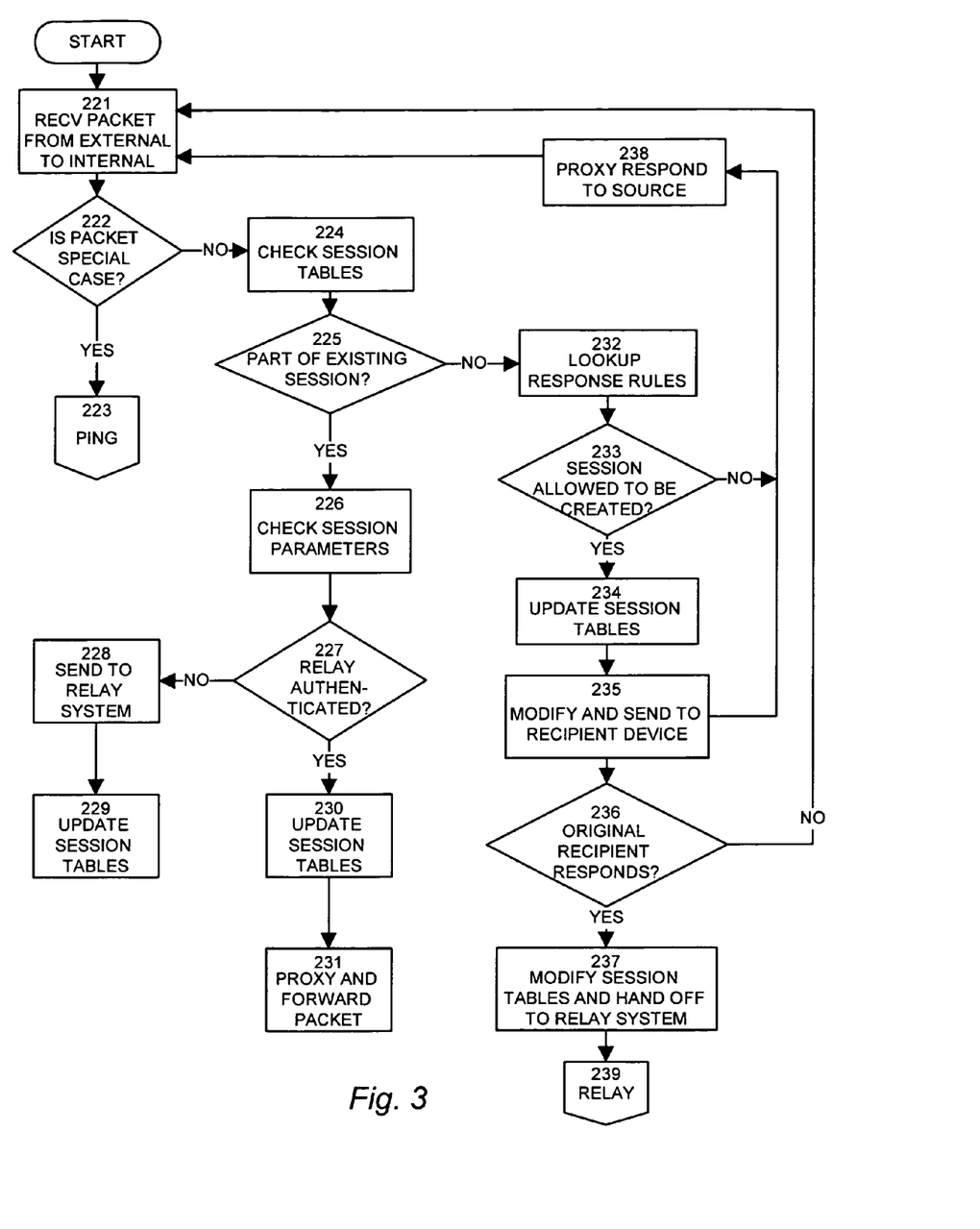
FIG. 3 is a flow chart of processing steps that shows example details of gateway system processing.

FIG. 3 is a flow chart that describes processing that the network protection system 150, and specifically the gateway 151, applies to a flow of packets 160 from external computer systems 104 on the external network 105 that are destined for internal computer systems and devices 108 on the internal protection network 107. This flow chart provides a general example showing that certain types of communications packets 160 arriving at the gateway 151 from remote sources were 104 are processed early and that new connections, if permitted, are directed to the replay system 152. The replay system responses 162 are treated as outbound packets to be sent from the internal network 107 to the external network 105 and are explained with respect to the flow chart of processing in FIG. 6.

In step 221, the gateway 151 receives a packet 160 directed from an external device 104 to internal device 108.

In step 222 the gateway 151 determines if the packet 160 is part of a statefull communications session or a stateless session (such as an ICMP ping packet). If the packet 160 is a stateless case packet, processing proceeds to step 223 for processing and creation of pseudo-state as is done for ICMP ECHO request packets. Details of ICMP packet processing in step 223 will be explained later in a flow chart in FIG. 4. Alternatively, in step 222 if the gateway 151 determines that the packet 160 is not a special case packet, processing proceeds to steps 224 and 225.

In steps 224 and 225, the gateway 151 checks session tables to determine if the packet 160 is part of a continuing or existing communication session. If the data communications traffic 160 is initial data communications traffic (e.g. is an initial connection attempt), the gateway 151 proceeds to step 232. Alternatively, in step 225 if the initial data communications traffic 160 is part of an existing session, processing proceeds to step 226 (explained below after steps 232 through 239).

In steps 232 and 233, the gateway 151 performs a lookup of response rules to determine if information in the packet 160 indicates whether or not the session should be created. If the session is not allowed to be created, processing proceeds to step 238 at which point the gateway 151 proxy responds 161 to the source 104/125 to provide the appearance of existence of an intended recipient device for the inbound traffic 160, regardless if the intended recipient device of the initial data communications traffic 160 actually exists on the internal network 107. As noted above, the proxy response 161 can indicate to the source 104/125 of the initial packet 160 that the address to which the initial packet 160 was sent is operational on the internal network 107 and that the particular service or protocol being requested is also functional.

In step 233, if it is determined that the session is allowed to be created (i.e., there is nothing at this point in the communication session in the initial packet that indicates a malicious attempt to probe or scan the network), processing proceeds to step 234.

In step 234, the gateway 151 updates session tables 191 to indicate the existence of a new session from the source 104 and in step 235, the gateway 151 modifies the initial packet 160 and forwards the modified initial packet 163 to the intended recipient device 108 within the internal network 107. That is, the gateway 151 determines if the intended recipient device (i.e. identified by an address) to which the data communications traffic is directed actually exists on an internal network, and if so, forwards the data communications traffic to the intended recipient device 108. A modification made to the initial packet 160 can include performing network address translation of the packet as an example. Note in this example that step 235 provides for a situation in which, whether or not a session is allowed to be created, the external source 104 still receives a falsified positive response 161 indicating existence of the requested host and service. In this example, only after the replay system 152 has authorized or authenticated a session is communications session state rolled up with the actual intended recipient holds 108.

In step 236, the gateway 151 determines if the original intended recipient device 108 responds to the modified initial packet 163. If there is no response from the intended recipient device 108 to the modified initial packet 163, this may indicate that the recipient device 108 is configured to ignore or drop packets from the source 104 and thus processing proceeds to step 238 at which point the gateway 151 prepares and forwards a proxy response 161 back to the source 104. In this case, since the original intended recipient device 108 did not respond to the initial data communications traffic 160, the gateway 151 can create a proxy response 161 that hides the true identity of the intended recipient device 108. As an example, the gateway 151 can prepare a sanitized proxy response 161 that fabricates an operating system type that is different than the operating system type of the actual host computer system 108 (or that sets it to unknown).

In step 236, if the intended recipient device 108 does respond to the modified initial data communications traffic packet 163, processing proceeds to step 237 at which point the gateway 151 modifies session tables 191 indicating that the intended recipient device 108 intended to respond and forwards the response 164 in the intended recipient buys 108 to the relay system 152. Thereafter, processing proceeds to step 239 described in the flow chart of processing steps for the relay system 152 in FIG. 5.

Returning attention to step 225 FIG. 3, if the initial data communications traffic 160 is part of an existing session, processing proceeds to step 226 at which point the gateway 151 checks session parameters within the session tables 191 to determine if the session has already been authorized or authenticated by the replay system 152.

In step 227, if the replay system 152 has already authenticated or authorized the session, the gateway 151 updates session tables 191 in step 230 and proxy forwards the packet 160 in step 231 as a modified packet 163 towards the intended recipient device 108 within the internal network 107. In particular, in step 231, the gateway 151 has determined that the data communications traffic 160 is continuing data communications traffic for an existing data communication session. If this is the case, then the gateway 151 can adjust session information in the packets 160 (to make packets 163) and in response packets 164 (to make packets 161) between the source 104 and intended recipient device 108 during the lifetime of the communications protocol session to account for the replay system 152 engaging in the early stages of the communications protocol session with the source of the data communications traffic communications 160 from the source 104.

In step 227, if the replay system 152 has not already completed authorization or authentication of the session, processing proceeds to step 228 at which point the gateway 151 forwards the initial communications traffic 160 to the replay system 152 and in step 229, updates session tables 191 with the continuing communications of an existing session that has not yet been fully authorized by the replay system 152. In this manner, as a remote source 104 attempts to engage in communications with an internal host 108 (or to an address being probed), the early stages of the communications are routed to the replay system 152 which continues to engage the remote source 104 until either the remote source discontinues communication or until the replay system 152 determines that the intended communications should be allowed or denied (and thus directed to the honeypot process).

Accordingly, the gateway 151 can detect network scanning probe traffic transmitted from an external network device that is attempting to identify an existence of at least one device operating at least one protocol on the internal network. When proxy responding to a source of the initial data communications traffic, the gateway 151 creates an expected response that contains information that includes a network scanning probe response 161 in accordance with the protocol to provide the apparent existence of the at least one device operating at least one protocol on an internal network 107, regardless if the device on an internal network is actually operating on the internal network 107.

Figure 4:
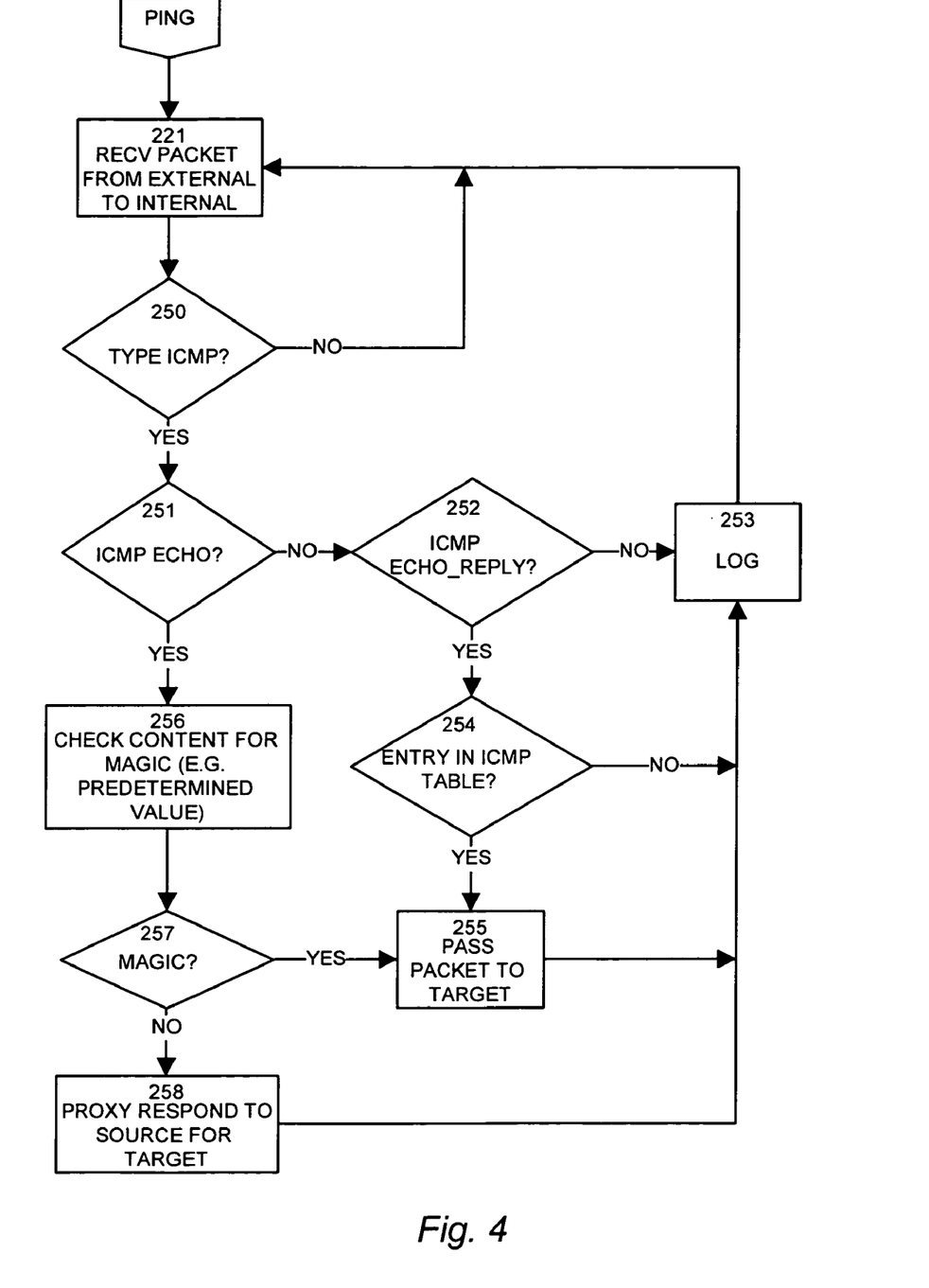
FIG. 4 is a flow chart of processing steps that shows example details of replay system processing.

As noted above in step 222 of FIG. 3, if the packet 160 arriving from the remote source 104 is a special case packet such as an ICMP packet, processing proceeds to the flow chart of processing steps in FIG. 4.

FIG. 4 is a flow chart of processing steps that shows processing for special packets such as ICMP ping packets. In this example, the focus of processing is limited to ICMP ping requests and responses and ICMP echo and echo replies are examples of special case sessions.

Step 221 in FIG. 4 is the same as discussed above with respect to FIG. 3 and covers processing in which the gateway 151 receives an incoming packet 160 from a remote source 104.

In step 250, the gateway 151 determines if the packet 160 is an ICMP packet. If not, processing reverts to step 221 in FIG. 3. However, if the packet 160 is an ICMP packet, in step 251 the gateway 151 determines if the packet 160 is an ICMP echo packet. If the packet is not an ICMP echo packet, processing proceeds to step 252.

In step 252, the gateway 151 determines if the packet is an ICMP echo reply packet. If not, the gateway 151 performs logging of the packet in step 253 and transfers processing to step 221 in FIG. 3. In step 252 if the gateway 151 determines that the packet is an ICMP echo reply packet, processing proceeds to step 254.

In step 254, the gateway determines if a corresponding entry exists in an ICMP session table (maintained as part of session tables 191). If so, processing proceeds to step 255 at which point the gateway 151 passes the packet back to the target intended recipient device 108 within the internal network 107. In other words, in step 255 it has been determined by the gateway 151 that the ICMP ping should be allowed to pass through the gateway 151 for processing by the intended recipient device 108.

Likewise, in step 251 if the gateway 151 determines that the packet 160 is an ICMP echo packet, processing proceeds to step 256 at which point the gateway 151 checks the contents of the packet 160 for "magic". Magic in this context is information that indicates to the gateway 151 whether or not the ICMP ping packet should be forwarded to the intended recipient device 108. As an example, the administrator 130 of the internal network 107 may be determine that for ICMP ping packets to be allowed, they must contain a certain predefined sequence number (rather than a randomly selected sequence number). In this manner, a remote host 104 aware of this condition can preset the sequence number within the ICMP ping packet to allow it to pass through the gateway 151.

In step 257, if the predefined magic content is not present within the ICMP echo packet 160, the gateway 151 in step 258 proxy responds 161 to the source 104 of the initial packet 160 with falsified information about the identity and services available from the intended recipient device. Processing than proceeds to step 253 at which point the gateway 151 logs information concerning the attempted connection. The logging step 253 can include forwarding a received packet 160 to the replay system 152 for processing in accordance with FIG. 5.

In this manner, the gateway 151 can detect a port scan or ping of an internal network from the external network device 104 and for each unrecognized port scan traffic packet 160 received, the gateway 151 provides a port scan traffic response 161 indicating that each scanned-for service is open and each address of an internal network device that is scanned is populated with an operational device, regardless if such devices exist and are operational. If the remote source 104 performs attempted repeated scans of different host addresses for different service ports, the gateway 151 produces a collective set of port scan traffic responses 161 returned to the external network device 104 that creates a cost-prohibitive amount of time and effort to be expended by the malicious application 125, without returning reliable or believable results, for purposes of attempting to identify and connect using an identified protocol with an actual operating device 108 within the internal network 107. In the context of a port scan for example, the system produces a positive response for each scan, thus creating a cost-prohibitive amount of data to analyze in an attempt to identify and connect using an identified protocol with an actual operating device within the internal network that is being scanned.

Figure 5:
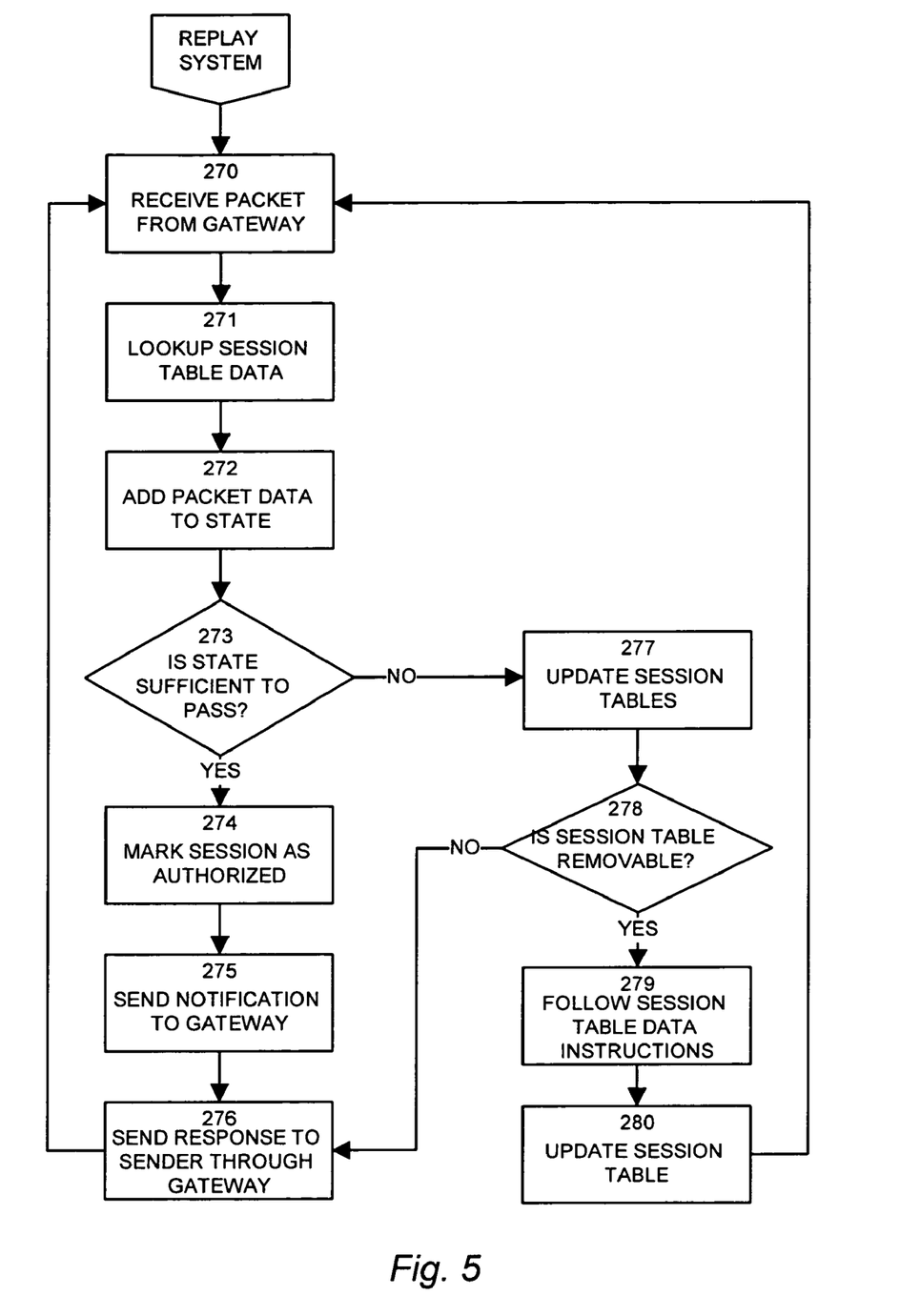
FIG. 5 is a flow chart of processing steps that shows example details of ICMP packet processing.

FIG. 5 shows processing details of the replay system 152. Generally, the replay system 152 "pretends" to be the intended recipient device 108 until it is convinced that a legitimate protocol exchange has occurred with the remote source 104/125. In this manner, the replay system 152 prevents most banner scanning attempts and enables sessions with malicious remote sources 104 to be sent to elaborate honeypot systems if desired. Generally, if the data communications traffic 160 is initial data communications traffic for a new data communications session, the gateway 151 forwards the data communications traffic 160 to the replay system 152 that can engage the source 125 of the data communications traffic in early stages of a communications protocol session associated with the data communication traffic to determine if the source 104/125 is engaged in malicious processing. The replay system 152 caches session state 192 associated with the communications protocol session during this process. If it is substantially determined that the source is not engaged in malicious processing, the replay system 152 in conjunction with the gateway 151 engages the intended recipient device 108 with the cached session state 192 of the communications protocol session to roll-forward the communications protocol session with the intended recipient device 108 to allow the intended recipient device 108 to thereafter (i.e., once authorized) communicate with the source 104/125 of the data communications traffic.

In particular, in step 270 the replay system 152 receives a packet 160 from the gateway 151 and looks-up replay session table data 192 (and possibly session table data 191) to identify if there is a session associated with the packet 160.

In step 272, the replay system adds packet data to the state maintained within the replay session tables 192 and determines, in step 273 if the state accumulated up to this point in time is sufficient to allow the communications session to be passed to the intended recipient device 108. If not, processing proceeds to step 277.

In step 277, the replay system 152 updates the replay session tables 192 to indicate that session state is still insufficient to allow the session to be passed to the intended recipient device 108 and processing proceeds to step 278.

In step 278, the replay system 152 determines if the replay session table 192 for the session is removable. This may occur if the session has timed out for example. If so, processing proceeds to steps 279 and 280 during which the replay system 152 follows the session table data instructions in order to update the session table 192. This may remove state information associated with the session if it appears that the session has terminated.

In step 278 if the session table is determined to not be removable at this time, processing proceeds to step 276 at which point the replay system 152 operates in conjunction with the gateway 151 to send a response 161 to the source 104 to further engage the source 104 in additional communications associated with the early stages of the communications session. In this manner, the replay system 152 engages in source 104 of the initial data communications traffic 160 for a long enough period of time to determine if the source 104 is operating maliciously (or not).

Returning attention to step 273, if the replay system 152 determines that state within the session tables 191 and 192 is sufficient to allow the communications session to be forwarded to the intended recipient device 108, processing proceeds to step 274.

In step 274, the replay system 192 marks the session information within the replay state table 192 and session table 191 with an indication that the replay system 152 has authorized the session from the source 104/125 to the intended recipient device 108 and in step 275 sends a notification 199 to this effect to the gateway 151. Processing then proceeds to step 276 to forward an appropriate response to the source 104/125 through the gateway 151.

Note that in step 275, the notification 199 sent to the gateway 151 may be out of band and informs the gateway 151 to spawn a process that "rolls up" connection state information with the intended recipient device 108 on the internal network 107 to a state specified by the replay system 152. In this manner, in step 276 state is rolled forward manually by the gateway 151 sending one or more proxy packets 163 to the intended recipient device 108 until that system 108 has built up the appropriate connection state information. This also allows the intended recipient device 108 to apply any internal filtering or blocking mechanisms such as firewalls or other mechanisms that may be implemented within the internal network to further prevent additional malicious communications that may take place after the early stages of the communications protocol for the authorized session.

Figure 6:
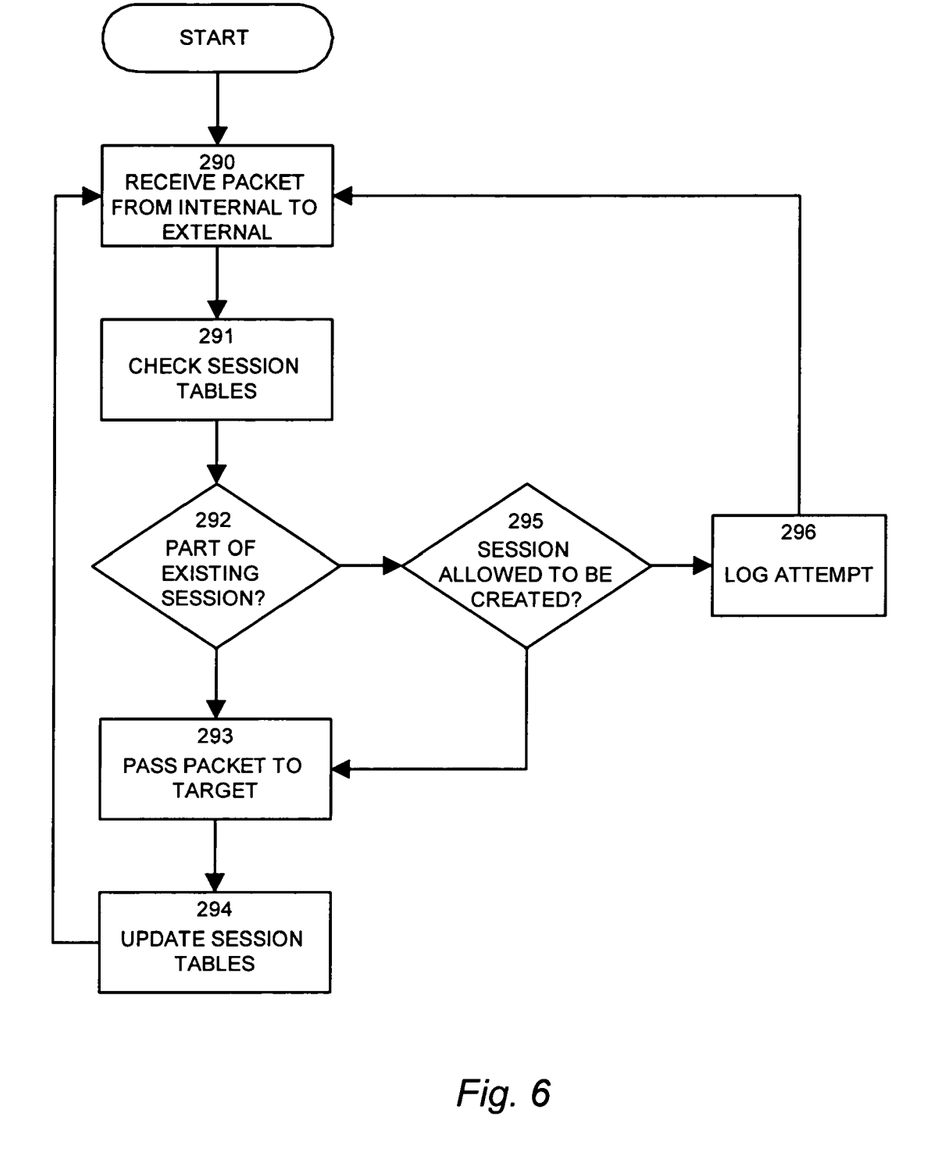
FIG. 6 is a flow chart of processing steps that shows example details outbound packet processing.

FIG. 6 is a flowchart of processing steps that shows processing applies to a flow of packets 164 originated from internal devices 108 on the internal network 107 destined for the external network 105. This illustrates the general case showing that internally initiated sessions are permitted if explicitly allowed or if state has been established.

In step 290, the gateway 151 receives a packet 164 being transmitted from an internal device 108 on the internal network 107 destined for a remote device 104 on the external network 105.

In steps 291 and 292, the gateway 151 examines session tables 191 to determine if the outbound packet 164 as part of an existing session. If it is, processing proceeds to step 293 in order to processing for the packet to the intended target device 104 on the external network 105. Such processing can include adjusting session information in the outbound data communications traffic 164 to account for initial engagement of the source 104 of the data communications traffic with the replay system 152 as explained above.

In step 294, the gateway 151 updates session tables 191 in order to maintain proper state information for the communications session.

In step 292, if the outbound packet 164 is not part of an existing session, processing proceeds to step 295 where the gateway 151 determines if the session should be allowed to be created or not. If the session is allowed to be created, processing proceeds to step 293 as explained above. If the session is not allowed to be created, processing proceeds to step 296 where the gateway system 151 logs the attempt in the log database 193.

In this manner, the network protection system 150 protects against scans and network probes. The approach presented herein is scalable to fit applications from small tactical workgroups up to the Internet/NIPRnet gateways and is easy to use by providing simple setup and sensible operating defaults so that decision makers can deploy the technology without extensive training. The system is also adaptable in that it can accommodate new intelligence, new operating procedures, and changes in local environments.

What is claimed is:

1. A method for processing data communications traffic, the method comprising:
   detecting data communications traffic arriving at a network device for an intended recipient device;
   determining if the data communications traffic is at least one of initial data communications traffic for a new data communications session, and continuing data communications traffic for an existing data communications session;
   if the data communications traffic is initial data communications traffic, proxy responding to a source of the initial data communications traffic with an expected response that provides an appearance of existence of an intended recipient device of the initial data communications traffic, regardless if the intended recipient device of the initial data communications traffic actually exists; and
   if the data communications traffic is initial data communications traffic for a new data communications session:
   forwarding the data communications traffic to a replay system, the replay system:
   i) engaging the source of the data communications traffic in early stages of a communications protocol session associated with the data communication traffic to determine if the source is engaged in malicious processing, wherein engaging the intended recipient device with the cached session state of the communications protocol session to roll-forward the communications protocol session with the intended recipient device comprises:
      adjusting session information between the source and intended recipient device during the lifetime of the communications protocol session to account for the replay system engaging in the early stages of the communications protocol session with the source of the data communications traffic;
   ii) caching session state associated with the communications protocol session; and
   ii) if it is substantially determined that the source is not engaged in malicious processing, engaging the intended recipient device with the cached session state of the communications protocol session to roll-forward the communications protocol session with the intended recipient device to allow the intended recipient device to communicate with the source of the data communications traffic.

2. The method of claim 1 wherein detecting data communications traffic arriving at a network device for an intended recipient device comprises:
   detecting network scanning probe traffic transmitted from an external network device that is attempting to identify an existence of at least one device operating at least one protocol on an internal network; and
   wherein proxy responding to a source of the initial data communications traffic to the source of the initial data communications traffic with an expected response comprises:
   creating the expected response to contain information that includes network scanning probe response in accordance with the at least one protocol to provides the apparent existence of the at least one device operating at least one protocol on an internal network, regardless if the at least one device operating at least one protocol on an internal network is actually operating on the internal network.

3. The method of claim 2 wherein detecting network scanning probe traffic comprises:
   detecting a port scan of an internal network from the external network device; and wherein proxy responding comprises:
   for each port scan traffic request, providing a port scan traffic response indicating that each scanned-for service is open and each address of an internal network device that is scanned is populated with an operational device, regardless if such devices exist and are operational.

4. The method of claim 1 comprising:
   determining if the intended recipient device to which the data communications traffic is directed actually exists on an internal network, and if so, forwarding the data communications traffic to the intended recipient device.

5. The method of claim 4 wherein determining if the intended recipient device for which the data communications traffic is intended for receipt exists on an internal network comprises:
   determining if the data communications traffic is associated with an existing data communications session, and if so, determining if a replay system has authorized the existing data communications session with the intended recipient device, and if so:
   adjusting session information in the data communications traffic to account for initial engagement of the source of the data communications traffic with the replay system; and
   forwarding the adjusted data communications traffic to the intended recipient device.

6. The method of claim 5 comprising:
   receiving a response packet from the intended recipient device on the internal network to which the data communications traffic was directed; and
   determining if the response packet is associated with an existing data communications session, and if so, adjusting session information in the response packet to account for initial engagement of the destination of the response packet with the replay system for early portions of a protocol associated with the data communications traffic.

7. The method of claim 1 wherein determining if the data communications traffic is at least one of initial data communications traffic for a new data communications session comprises:
   detecting the that data communications traffic is initial data communications traffic containing an Internet Control Messaging Protocol PING message directed to an address within an address range assigned to an internal network;
   and wherein proxy responding to a source of the initial data communications traffic comprises:
   determining if the Internet Control Messaging Protocol PING message is an allowed message, and if so, forwarding the Internet Control Messaging Protocol PING message to the intended recipient device, and if not, proxy responding with a Internet Control Messaging Protocol PING response message that masks information concerning the actual intended recipient device within the internal network.

8. The method of claim 7 wherein determining if the Internet Control Messaging Protocol PING message is an allowed message comprises:
   determining if the Internet Control Messaging Protocol PING message has predefined data that indicates the Internet Control Messaging Protocol PING message is an allowed Internet Control Messaging Protocol PING message.

9. A computerized device comprising:
a memory;
at least one processor;
a communications interface;
an interconnection mechanism coupling the memory, the at least one processor and the communications interface;
wherein the memory is encoded with an application that, when executed, provides a process that processes data communications traffic, the process causing the computerized device to perform the operations of:
detecting data communications traffic on the communications interface arriving at a network device for an intended recipient device;
determining if the data communications traffic is at least one of initial data communications traffic for a new data communications session, and continuing data communications traffic for an existing data communications session;
if the data communications traffic is initial data communications traffic, proxy responding to a source of the initial data communications traffic via the communications interface with an expected response that provides an appearance of existence of an intended recipient device of the initial data communications traffic, regardless if the intended recipient device of the initial data communications traffic actually exists; and
if the data communications traffic is initial data communications traffic for a new data communications session:
forwarding the data communications traffic to a replay system, the replay system:
i) engaging the source of the data communications traffic in early stages of a communications protocol session associated with the data communication traffic to determine if the source is engaged in malicious processing, wherein engaging the intended recipient device with the cached session state of the communications protocol session to roll-forward the communications protocol session with the intended recipient device comprises:
adjusting session information between the source and intended recipient device during the lifetime of the communications protocol session to account for the replay system engaging in the early stages of the communications protocol session with the source of the data communications traffic;
ii) caching session state associated with the communications protocol session; and
ii) if it is substantially determined that the source is not engaged in malicious processing, engaging the intended recipient device with the cached session state of the communications protocol session to roll-forward the communications protocol session with the intended recipient device to allow the intended recipient device to communicate with the source of the data communications traffic.

10. The computerized device of claim 9 wherein when the computerized device performs the operation of detecting data communications traffic arriving at a network device for an intended recipient device, the computerized device performs operations of:
detecting network scanning probe traffic transmitted from an external network device that is attempting to identify an existence of at least one device operating at least one protocol on an internal network; and
wherein when the computerized device performs the operation of proxy responding to a source of the initial data communications traffic to the source of the initial data communications traffic with an expected response, the computerized device performs the operation of:
creating the expected response to contain information that includes network scanning probe response in accordance with the at least one protocol to provides the apparent existence of the at least one device operating at least one protocol on an internal network, regardless if the at least one device operating at least one protocol on an internal network is actually operating on the internal network.

11. The computerized device of claim 10 wherein when the computerized device performs the operation of detecting network scanning probe traffic comprises:
detecting a port scan of an internal network from the external network device; and
wherein proxy responding comprises:
for each port scan traffic request, providing a port scan traffic response indicating that each scanned-for service is open and each address of an internal network device that is scanned is populated with an operational device, regardless if such devices exist and are operational, such that a collective set of port scan traffic responses returned to the external network device creates a cost-prohibitive amount of data to be used for purposes of attempting to identify and connect using an identified protocol with an actual operating device within the internal network.

12. The computerized device of claim 9 wherein the computerized device performs the operation of:
determining if the intended recipient device to which the data communications traffic is directed actually exists on an internal network, and if so, forwarding the data communications traffic to the intended recipient device.

13. The computerized device of claim 12 wherein when the computerized device performs the operation of determining if the intended recipient device for which the data communications traffic is intended for receipt exists on an internal network, the computerized device performs the operations of:
determining if the data communications traffic is associated with an existing data communications session, and if so, determining if a replay system has authorized the existing data communications session with the intended recipient device, and if so:
adjusting session information in the data communications traffic to account for initial engagement of the source of the data communications traffic with the replay system; and
forwarding the adjusted data communications traffic to the intended recipient device.

14. The computerized device of claim 13 wherein the computerized device performs the operations of:
receiving a response packet from the intended recipient device on the internal network to which the data communications traffic was directed; and
determining if the response packet is associated with an existing data communications session, and if so, adjusting session information in the response packet to account for initial engagement of the destination of the response packet with the replay system for early portions of a protocol associated with the data communications traffic.

15. The computerized device of claim 9 wherein when the computerized device performs the operation of determining if the data communications traffic is at least one of initial data communications traffic for a new data communications session, the computerized device performs the operation of:
  detecting the that data communications traffic is initial data communications traffic containing an Internet Control Messaging Protocol PING message directed to an address within an address range assigned to an internal network;
  and wherein when the computerized device performs the operation of proxy responding to a source of the initial data communications traffic, the computerized device performs the operation of:
  determining if the Internet Control Messaging Protocol PING message is an allowed message, and if so, forwarding the Internet Control Messaging Protocol PING message to the intended recipient device, and if not, proxy responding with a Internet Control Messaging Protocol PING response message that masks information concerning the actual intended recipient device within the internal network.

16. The computerized device of claim 15 wherein when the computerized device performs the operation of determining if the Internet Control Messaging Protocol PING message is an allowed message, the computerized device performs the operation of:
  determining if the Internet Control Messaging Protocol PING message has predefined data that indicates the Internet Control Messaging Protocol PING message is an allowed Internet Control Messaging Protocol PING message.

17. A non-transitory computer readable storage medium including computer program instructions encoded thereon that, when executed on a computer system, provides processing of data communications traffic by causing the computer system to perform the operations of:
  detecting data communications traffic arriving at a network device for an intended recipient device;
  determining if the data communications traffic is at least one of initial data communications traffic for a new data communications session, and continuing data communications traffic for an existing data communications session; and
  if the data communications traffic is initial data communications traffic, proxy responding to a source of the initial data communications traffic with an expected response that provides an appearance of existence of an intended recipient device of the initial data communications traffic, regardless if the intended recipient device of the initial data communications traffic actually exists;
  and if the data communications traffic is initial data communications traffic for a new data communications session:
  forwarding the data communications traffic to a replay system, the replay system:
  i) engaging the source of the data communications traffic in early stages of a communications protocol session associated with the data communication traffic to determine if the source is engaged in malicious processing, wherein engaging the intended recipient device with the cached session state of the communications protocol session to roll-forward the communications protocol session with the intended recipient device comprises:
    adjusting session information between the source and intended recipient device during the lifetime of the communications protocol session to account for the replay system engaging in the early stages of the communications protocol session with the source of the data communications traffic;
  ii) caching session state associated with the communications protocol session; and
  ii) if it is substantially determined that the source is not engaged in malicious processing, engaging the intended recipient device with the cached session state of the communications protocol session to roll-forward the communications protocol session with the intended recipient device to allow the intended recipient device to communicate with the source of the data communications traffic.

18. The method of claim 1 wherein said adjusting session information includes modifications to sequence and acknowledgment numbers and port translations.

19. The computerized device of claim 9 wherein said adjusting session information includes modifications to sequence and acknowledgment numbers and port translations.

20. The method of claim 1 wherein said engaging further comprises engaging in initial application dialog.

21. The computerized device of claim 9 wherein said engaging further comprises engaging in initial application dialog.

* * * * *